Oct. 17, 1967  R. P. TAYLOR ETAL  3,347,709
LAYER TYPE BATTERY HAVING BOTH TERMINALS AT ONE END
Filed Feb. 27, 1964
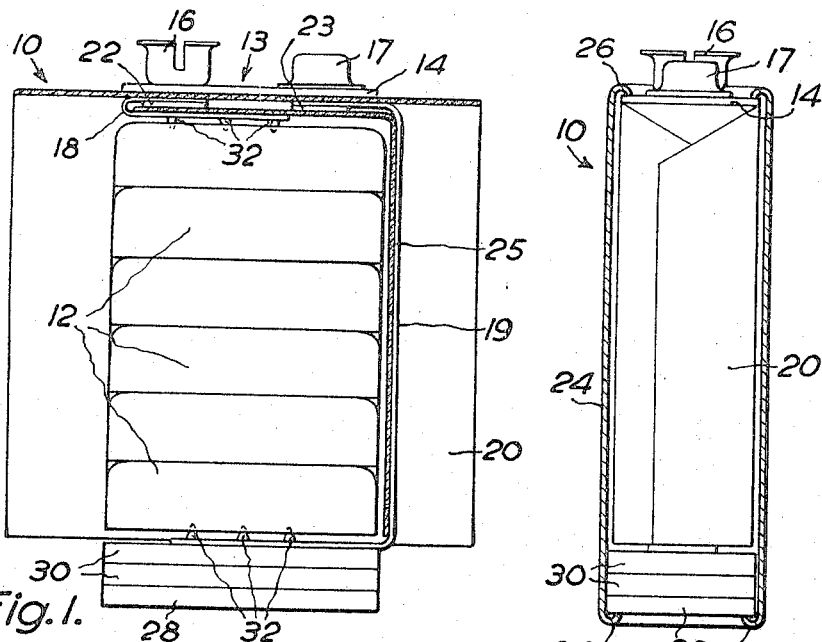
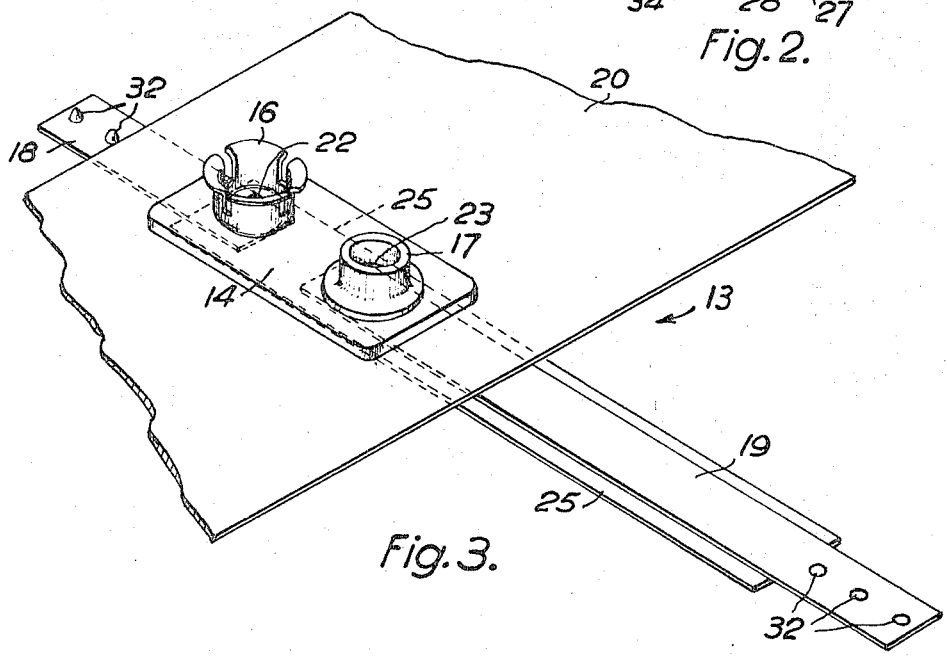
Inventors
Roy P. Taylor
David Robb Oct. 17, 1967  R. P. TAYLOR ETAL  3,347,709
LAYER TYPE BATTERY HAVING BOTH TERMINALS AT ONE END
Filed Feb. 27, 1964  2 Sheets-Sheet 2
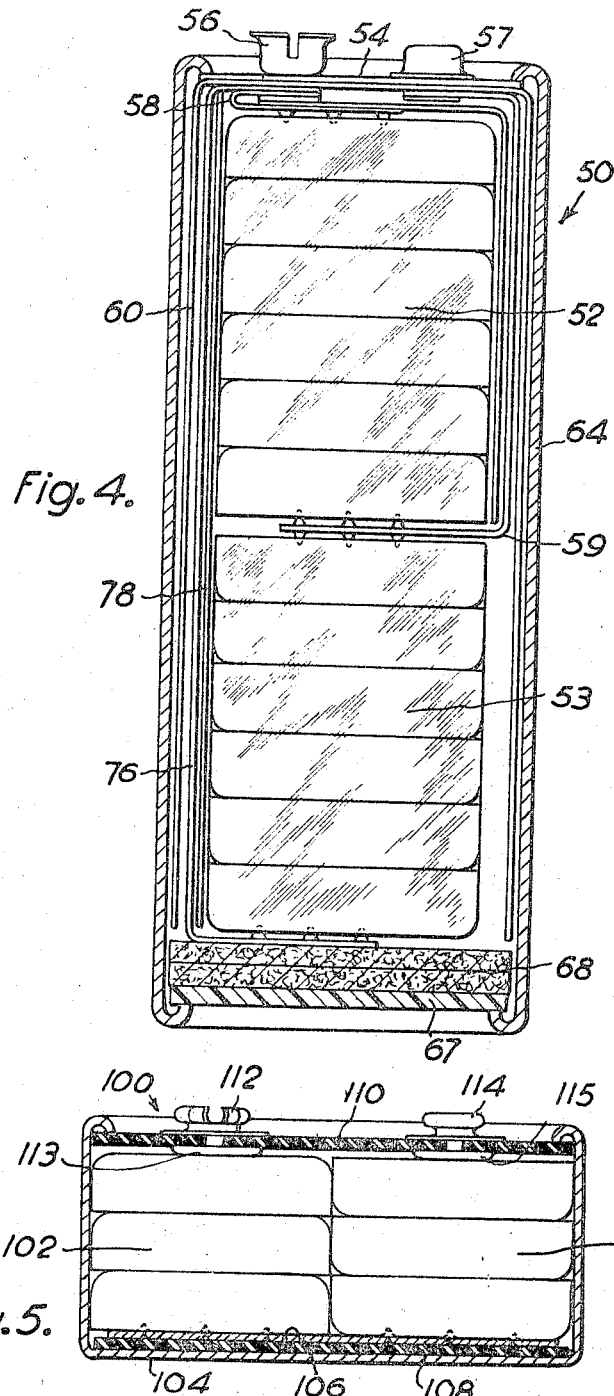
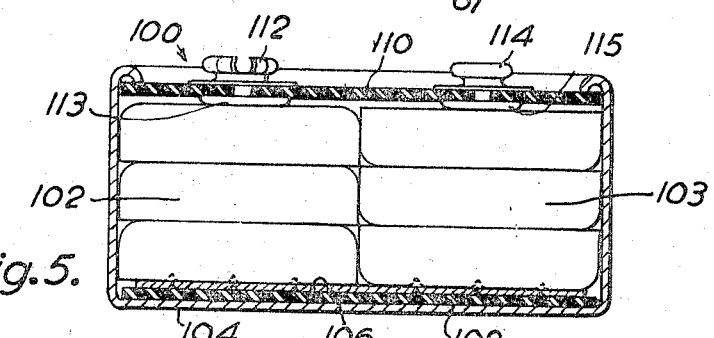
Inventors
Roy P. Taylor
David Robb

United States Patent Office 3,347,709
Patented Oct. 17, 1967

3,347,709
LAYER TYPE BATTERY HAVING BOTH
TERMINALS AT ONE END
Roy P. Taylor, Erith, Kent, England, and David Robb, Dundee, Scotland, assignors to Burndept Limited, a British company
Filed Feb. 27, 1964, Ser. No. 347,943
2 Claims. (Cl. 136—108)

This application is a continuation in part of our co-pending application Serial No. 257,049 now abandoned, filed January 29, 1963 entitled "Dry Galvanic Batteries."

The invention relates to layer type batteries contained in metal cans and has for its principal object the simplification of the assembly of such batteries and a further object is the provision of a battery having both its terminals at one end.

The invention proceeds from the discovery that it is possible to effect satisfactory electrical contact between a bare part of a terminal member, that is to say either the terminal proper or a metal part such as a conductor strip electrically connected to the terminal or to one end of another stack of cells and one end of a stack of cells and between a conductor strip, for example a piece of metal foil, and the other end of the stack, if the stack is inserted into a metal sleeve and the ends of the metal sleeve are curled over the edges of the plates closing the ends of the sleeve.

The invention is equally applicable to batteries made from a single stack of cells, from a plurality of stacks placed end to end and from a plurality of stacks placed side by side. The choice of number and disposition and mode of interconnection of the stacks will be dictated, in a manner well understood by those skilled in the art, by the voltage required, the current to be drawn and the manner continuous or intermittent, of discharge, and the standard dimensions of the finished battery. In many cases the best arrangement in a single stack but parallel or series connection of two stacks is sometimes indicated. For example the parallel connection of two stacks of equal voltage can enable a battery of a given physical size, electrical capacity and voltage to deliver a higher current than a single stack battery, or to maintain a steadier voltage if discharged at a given rate, on account of its lower internal resistance.

The invention will be further described by reference to three exemplary embodiments of the discovery set forth above which are illustrated in the accompanying drawings, in which:

FIGURE 1 is a front elevation of a stack of cells and a terminal plate of a first embodiment having but a single stack of cells with metal sleeve removed and a paper wrapping for the stack folded aside;

FIGURE 2 is a sectional side elevation of the same, showing the stack fully wrapped and in position within the metal sleeve, ends of which are curled over the edges of its closing plates.

FIGURE 3 is an isometric view of the terminal plate assembly comprising terminals, paper wrapping and contact strips for the same, one of the strips covered by adhesive tape.

FIGURE 4 is a vertical section of metal sleeve and paper wrapping with a view, similar to FIGURE 1 of the terminal assembly and stacks of a second embodiment in which two stacks of cells are disposed in end to end relationship and connected electrically in parallel; and FIGURE 5 is a vertical section of a third embodiment in which two stacks of cells, inverted in relation to one another, are inserted side by side into a metal can and are electrically in series with one another.

The battery 10 shown in FIGURES 1 through 3 of the accompanying drawings consists of a single stack 12 of six cells.

A terminal plate assembly 13 shown in detail in FIGURE 3, comprises a panel 14 of dielectric material which carries two terminals 16, 17 of the press-stud or other type exposed on the upper surface and each carrying a metal connection strip, 18, 19 respectively and also serving to rivet a sheet of paper 20 to the underside of the plate 14. This plate assembly is preassembled with the sheet 20 and strips 18, 19 attached on the underside of the plate 14 and fixed by rivets 22, 23, the heads of which are formed inside the terminals, 16, 17 respectively then part of the strip 19 is covered with adhesive tape 25. The assembly 13 is placed upon the stack 12 and the paper 20 is wrapped around the stack. The metal strip 18 carried by the terminal 16 makes contact with the upper end connection of the stack 12. The second, longer, metal strip 19, suitably covered with adhesive tape 25 to protect the stack, connects the second terminal 17 with the bottom end of the stack 12, passing down between the walls of the stack and the paper sheet 20 in which they are wrapped.

The wrapped stack 12 with terminal plate assembly 13, packing 30 and base plate 28 are inserted into a metal sleeve 24 for example of thin sheet of metal lacquered on the inside and printed or covered with a decorative label on the outside. To ensure good electrical contact, pressure is applied between the base and terminal plates, which presses the stack and contact strips firmly together. The ends of the sleeve are then curled over the edges of the terminal and base plates to maintain this condition.

Preferably the two metal strips 18 and 19 are given small pointed projections 32 on the surface which make contact with the respective ends of the stack 12 to help to ensure good electrical contact.

The second battery 50 to be described as an embodiment of the invention is shown in FIGURE 4. The battery 50 is generally similar to the battery 10 described above, but instead of a single stack of cells 12 as in the first embodiment, there are two stacks of cells 52 and 53 inverted in relation to one another and inserted end to end into the metal sleeve 64. The two stacks of cells are connected to the two terminals 56 and 57 so that they are electrically in parallel thus enabling a battery of a given physical size, electrical capacity and voltage to deliver a higher current than a single stack battery, or to maintain a steadier voltage if discharged at a given rate, on account of its lower internal resistance.

The upper stack 52 is connected to the two terminals 56 and 57 by two metal conductor strips 58 and 59 respectively in just the same way as the single stack 12 of the battery 10 described with reference to FIGURES 1 to 3 but the longer metal strip connection 59 to the lower end of the stack 52 is also pressed into contact with the upper end of the second, lower stack 53 both, the lower end of the stack 52 and upper end of stack 53 being of the same polarity, e.g. positive.

The terminal 56 which is connected to the upper end of the upper stack 52 by short strip 58 folded under the terminal plate 54 is also connected to lower end of the lower stack 53 by a third, long, metal strip 76 passing down alongside the two stacks inside the sleeve 64 and the paper wrapping 60 by which it is insulated from the metal sleeve 64.

The stacks 52 and 53 are protected from the sharp edges of strips 59 and 76 by adhesive tapes 77 and 78. The bare end of strip 76 is pressed between the bottom end of the lower stack 53 and the bottom plate 67 closing the sleeve 64 or between the bottom end of stack 53 and packing 68 if eventually added to adjust the length of battery components to suit the length of the sleeve 64.

The battery 100 shown in FIGURE 5 as a third embodiment of the invention comprises two stacks of layer cells 102 and 103.

The stack 103 is inverted in relation to the stack 102 regarding their polarities and they are inserted side by side into a metal can 104 of thin metal sheet lacquered on the inside and printed or covered with a decorative label on the outside.

The two stacks 102 and 103 are connected at the bottom by a piece of conductive foil 106 attached to the upper face of an insulating plate 108, which is first dropped in, the foil 106 being of a size and shape to connect the stacks when they are pressed down against it.

The second insulating plate 110 fitting the can 104 and carrying two terminals 112 and 114 of the press-stud or other type, exposed on the upper surface but also having bare parts 113 and 115 on the underneath of the plate 110, is placed upon the two stacks 102 and 103 in position such that the bare parts 113 and 115 make contact with the upper ends of the respective stacks 102 and 103.

The plate 110 is pressed down to make good contact and the edges of the metal can 104 are curled over the edges of the plate 110 thus holding the plate pressed firmly against the stacks 102 and 103.

As an alternative to the metal can 104 with integral bottom a rectangular metal sleeve may be used, both ends of which will be curled over the edges of the terminal and bottom plates.

Instead of the foil connection 106 between two stacks 102 and 103 the connection may be a wire or the like attached to the plate 108 before they are inserted into the can 104.

It will thus be seen that by our invention we have provided a construction for layer type batteries contained in metal containers which simplifies the assembly of such batteries by rendering unnecessary the conventional soldered connections between ends of stacks and the terminals and the usual tape or other bindings for the stacks. It will also be seen that the constructions in accordance with the invention facilitates the provision of a battery having both the terminals at one end.

We claim:
1. A battery of layer type cells comprising a stack of cells; a metal sleeve with open ends, in which the said stack is contained; plates of dielectric material closing the said open ends of the sleeve two terminals carried on one of the said plates; a conductor strip connected to one of said terminals, insulated from said container and the side of said stack, and passing alongside said stack to the end thereof remote from said plate carrying said terminals and a second conductor strip connected to the other of said terminals and in contact with the end of stack adjacent said plate; the said open ends of the sleeve being curled over the edges of said plates and said conductor strips being urged thereby into good electrical contact with ends of said stack, said stack being wrapped in a sheet paper and wherein said terminal plate, terminals, conductor strips and said sheet of paper form a subassembly; the said terminals, strips and sheet of paper al being rivetted to the said plate.

2. A battery of layer type cells comprising two stacks of cells; a metal sleeve with open ends in which the said stacks are contained, the said stacks being disposed end to end and inverted in relation to one another; plates of dielectric material closing the open ends of the container; two terminals carried on one of the said plates; two conductor strips connected to one of said terminals; and a third conductor strip connected to the other of said terminals; the said two strips being in contact with opposite ends of the respective stacks and the said third strip in contact with the adjacent ends of the two stacks; and the open ends being curled over the edges of said plates thereby to urge the said conductor strips into electrical contact with said stacks, said stacks being wrapped in insulating sheet material and wherein said terminal plate, terminals, conductor strips and said sheet of paper form a subassembly; the said terminals, strips and sheet of paper all being rivetted to the said plate.

References Cited

UNITED STATES PATENTS

| | | | |
|---|---|---|---|
| 2,527,576 | 10/1950 | Ruben | 136—111 |
| 2,971,999 | 2/1961 | Jacquier | 136—111 |
| 3,042,733 | 7/1962 | Toda et al. | 136—110 |
| 3,056,850 | 10/1962 | Rauske et al. | 136—173 |
| 3,061,661 | 10/1962 | Seeley | 136—111 |

WINSTON A. DOUGLAS, *Primary Examiner.*

A. SKAPARS, *Assistant Examiner.*